(12) United States Patent
Xu et al.

(10) Patent No.: US 11,304,269 B2
(45) Date of Patent: Apr. 12, 2022

(54) COOKING UTENSIL

(71) Applicants: FOSHAN SHUNDE MIDEA ELECTRICAL HEATING APPLIANCES MANUFACTURING CO., LIMITED, Foshan (CN); MIDEA GROUP CO., LTD., Foshan (CN)

(72) Inventors: Tengfei Xu, Foshan (CN); Peihong Wu, Foshan (CN); Yuhua Huang, Foshan (CN)

( * ) Notice: Subject to any disclaimer, the term of this patent is extended or adjusted under 35 U.S.C. 154(b) by 512 days.

(21) Appl. No.: 16/188,320

(22) Filed: Nov. 13, 2018

(65) Prior Publication Data
US 2019/0082504 A1 Mar. 14, 2019

Related U.S. Application Data

(63) Continuation of application No. PCT/CN2016/101196, filed on Sep. 30, 2016.

(30) Foreign Application Priority Data

May 13, 2016 (CN) .......................... 201610323141.6
May 13, 2016 (CN) .......................... 201620443383.4

(51) Int. Cl.
*H05B 6/12* (2006.01)
*A47J 27/00* (2006.01)
(Continued)

(52) U.S. Cl.
CPC ................ *H05B 6/12* (2013.01); *A47J 27/00* (2013.01); *H05B 6/44* (2013.01); *A47J 37/10* (2013.01)

(58) Field of Classification Search
CPC .......... A23G 9/083; A23G 9/322; A23G 9/34; A23G 9/44; A23G 9/48; A23G 9/503;
(Continued)

(56) References Cited

U.S. PATENT DOCUMENTS

| 5,412,171 A * | 5/1995 | Yahav | ....................... F24B 7/00 |
| | | | 219/621 |
| 2013/0153566 A1* | 6/2013 | Gulkanat | ............. H05B 6/1209 |
| | | | 219/622 |

FOREIGN PATENT DOCUMENTS

| CN | 1812673 A * | 8/2006 |
| CN | 1863418 A | 11/2006 |

(Continued)

OTHER PUBLICATIONS

International Search Report dated Jan. 26, 2017 in the corresponding International Application No. PCT/CN2016/101196.
(Continued)

*Primary Examiner* — Dana Ross
*Assistant Examiner* — Dilnessa B Belay
(74) *Attorney, Agent, or Firm* — Kilpatrick Townsend & Stockton, LLP

(57) ABSTRACT

A cooking utensil (100) includes a pan body (1), a cover body (2), and an induction coil (3). The pan body (1) is provided with a first electromagnetism conductive loop (11) and a first electric conductive heating strip (12) which are connected to form a closed circuit. The cover body (2) is provided with a second electromagnetism conductive loop (21) and a second electric conductive heating strip (22) which are connected to form a closed circuit. The induction coil (3) corresponds to the first electromagnetism conductive loop (11) and the second electromagnetism conductive loop (21).

23 Claims, 3 Drawing Sheets

(51) Int. Cl.
*H05B 6/44* (2006.01)
*A47J 37/10* (2006.01)

(58) Field of Classification Search
CPC ..... B26D 1/0006; A47J 27/00; A47J 37/0611; A47J 37/10; H05B 6/12; H05B 6/44
See application file for complete search history.

(56) References Cited

FOREIGN PATENT DOCUMENTS

| | | | |
|---|---|---|---|
| CN | 101449933 | A | 6/2009 |
| CN | 201360949 | Y | 12/2009 |
| CN | 201398884 | Y | 2/2010 |
| CN | 102563723 | A | 7/2012 |
| CN | 102613878 | A | 8/2012 |
| CN | 104797028 | A | 7/2015 |
| JP | 2004327221 | A | 11/2004 |
| JP | 2014203635 | A | 10/2014 |
| TW | 201028623 | A * | 8/2010 |
| TW | 201028623 | A * | 8/2010 |

OTHER PUBLICATIONS

The first Office Action dated Apr. 15, 2019 in the corresponding CN application No. 201610323141.6.

* cited by examiner

COOKING UTENSIL

FIELD

The present disclosure relates to the technical field of kitchen appliances, and particularly to a cooking utensil.

BACKGROUND

Generally, a cooking utensil (such as a rice cooker, a frying-baking machine, etc.) can dimensionally heat, that is a cover body (an upper baking pan) is provided with a heating element as well as a pan body (or a lower baking pan) is provided with a heating element, thereby achieving dimensional heating. Therefore, upper and lower faces of things which are processed can be heated evenly, achieving good taste. However, two or more than two heating elements are needed, which increases the manufacturing cost and results in overlarge products, and this goes against market demand.

No matter what kind of heating means (an induction heater or an electrical heat tube) of a cooking utensil adopts, a portion corresponding to an induction coil or the electrical heat tube is heated strongly, and portions away from a heat source is heated weakly, which result in uneven heating areas. In order to solve the above problem, a layer for heat diffusion (usually made from metal good at heat conduction, such as aluminum) is added between the heat source and the things to be processed, heat can be conducted to the things to be processed by means of the heat diffusion layer evenly, to reduce heat difference on the things to be processed, which however does not solve the problem that the things to be processed is not heated evenly.

SUMMARY

Embodiments of the present disclosure seek to solve at least one of the problems existing in the related art to at least some extent. Therefore, the present disclosure provides a cooking utensil capable of dimensionally and evenly heating.

The cooking utensil according to the present disclosure includes a pan body provided with a first electromagnetism conductive loop and a first electric conductive heating strip, and the first electric conductive heating strip and the first electromagnetism conductive loop being connected to form a closed circuit; a cover body covering the pan body and being openable relative to the pan body, provided with a second electromagnetism conductive loop and a second electric conductive heating strip, and the second electric conductive heating strip and the second electromagnetism conductive loop being connected to form a closed circuit; and an induction coil, arranged between the first electromagnetism conductive loop and the second electromagnetism conductive loop, and corresponding to the first electromagnetism conductive loop and the second electromagnetism conductive loop.

With the cooking utensil according to the present disclosure, the induction coil is arranged between the first electromagnetism conductive loop and the second electromagnetism conductive loop, when the induction coil energized, induced electromotive forces are produced on the first electromagnetism conductive loop and the second electromagnetism conductive loop at the same time, and the pan body and the cover body can be heated at the same time. Therefore, use of the induction coil can be reduced, cost can be saved, the utilization ratio of electromagnetic induction energy can be raised, and the cooking utensil can be made thinner.

According to an example of the present disclosure, the first electromagnetism conductive loop has an arc section with an upward opening, the second electromagnetism conductive loop has an arc section with a downward opening, the induction coil is arranged at an inner side of the first electromagnetism conductive loop and the second electromagnetism conductive loop.

According to an example of the present disclosure, an inner periphery of the first electromagnetism conductive loop corresponds to and is spaced apart from an inner periphery of the second electromagnetism conductive loop in an up-down direction, and an outer periphery of the first electromagnetism conductive loop corresponds to and is spaced apart from an outer periphery of the second electromagnetism conductive loop in the up-down direction.

According to an example of the present disclosure, the inner periphery of the first electromagnetism conductive loop and the inner periphery of the second electromagnetism conductive loop define a gap ranges from 1 mm to 20 mm therebetween, and the outer periphery of the first electromagnetism conductive loop and the outer periphery of the second electromagnetism conductive loop define a gap ranges from 1 mm to 20 mm therebetween.

According to an example of the present disclosure, both the inner periphery and the outer periphery of the first electromagnetism conductive loop are spaced apart from the inner periphery and the outer periphery of the second electromagnetism conductive loop by means of a spacer, respectively.

According to an example of the present disclosure, the cover body is a translucent cover body, and the second electric conductive heating strip is a translucent strip.

According to an example of the present disclosure, the cover body is a glass cover body, and the second electric conductive heating strip is an indium tin oxide (ITO) conductive strip.

According to an example of the present disclosure, a distance between the induction coil and the first electromagnetism conductive loop is not greater than a distance between the induction coil and the second electromagnetism conductive loop.

According to an example of the present disclosure, the first electromagnetism conductive loop extends along a periphery of the pan body and forms a loop with an aperture, two ends of the first electric conductive heating strip are connected to two ends at the aperture of the first electromagnetism conductive loop respectively and located at an inner side of the first electromagnetism conductive loop, the second electromagnetism conductive loop extends along a periphery of the cover body and forms a loop with an aperture, two ends of the second electric conductive heating strip are connected to two ends at the aperture of the second electromagnetism conductive loop respectively and located at an inner side of the second electromagnetism conductive loop.

According to an example of the present disclosure, the first electric conductive heating strip is evenly arranged at the pan body, and the second electric conductive heating strip is evenly arranged at the cover body.

According to an example of the present disclosure, the first electric conductive heating strip extends at the pan body in a circuitous way, and the second electric conductive heating strip extends at the cover body in a circuitous way.

According to an example of the present disclosure, any one of the first electric conductive heating strip and the second electric conductive heating strip includes a plurality of spirals spaced apart from each other, each spiral extends from an outer to an inner spirally along a circumferential direction of the insulating cover body, the plurality of spirals spiral in the same direction and are nested, and the plurality of spirals are connected in series.

According to an example of the present disclosure, the first electric conductive heating strip and the second electric conductive heating strip each comprise two spirals connected at inner ends.

According to an example of the present disclosure, the first electric conductive heating strip and the second electric conductive heating strip each are an electromagnetism insulated electric conductive heating strip.

According to an example of the present disclosure, a width of the first electromagnetism conductive loop is larger than that of the first electric conductive heating strip, and a width of the second electromagnetism conductive loop is larger than that of the second electric conductive heating strip.

According to an example of the present disclosure, the pan body is a ceramic pan body, and the cover body is a ceramic cover body.

According to an example of the present disclosure, a plurality of first electronic conductive heating strips and/or a plurality of first electromagnetism conductive loops are provided, each first electronic conductive heating strip is connected with at least one first electromagnetism conductive loop in series to form a circuit, each first electromagnetism conductive loop is connected with at least one first electronic conductive heating strip in series to form a circuit; and a plurality of second electronic conductive heating strips and/or a plurality of second electromagnetism conductive loops are provided, each second electronic conductive heating strip is connected with at least one second electromagnetism conductive loop in series to form a circuit, each second electromagnetism conductive loop is connected with at least one second electronic conductive heating strip in series to form a circuit.

According to an example of the present disclosure, a plurality of first electronic conductive heating strips are provided, the plurality of first electronic conductive heating strips are connected in parallel and then are connected with the first electromagnetism conductive loop in series to form a circuit; and a plurality of second electronic conductive heating strips are provided, the plurality of second electronic conductive heating strips are connected in parallel and then are connected with the second electromagnetism conductive loop in series to form a circuit.

According to an example of the present disclosure, a plurality of first electromagnetism conductive loops are provided, the plurality of first electromagnetism conductive loops are connected in parallel and then are connected with the first electronic conductive heating strip to form a circuit; and a plurality of second electromagnetism conductive loops are provided, the plurality of second electromagnetism conductive loops are connected in parallel and then are connected with the second electronic conductive heating strip to form a circuit.

According to an example of the present disclosure, a plurality of first electromagnetism conductive loops are provided and independent from each other, a plurality of first electronic conductive heating strips are provided and independent from each other, the plurality of first electronic conductive heating strips correspond to the plurality of first electromagnetism conductive loops one by one, each first electronic conductive heating strip is connected with the corresponding first electromagnetism conductive loop in series to form a circuit; and a plurality of second electromagnetism conductive loops are provided and independent from each other, a plurality of second electronic conductive heating strips are provided and independent from each other, the plurality of second electronic conductive heating strips correspond to the plurality of second electromagnetism conductive loops one by one, each second electronic conductive heating strip is connected with the corresponding second electromagnetism conductive loop in series to form a circuit.

According to an example of the present disclosure, a plurality of first electromagnetism conductive loops are provided and nested from an inner to an outer, a plurality of second electromagnetism conductive loops are provided and nested from an inner to an outer, the first electromagnetism conductive loops correspond to the second electromagnetism conductive loops one by one, and the first electromagnetism conductive loop and the second electromagnetism conductive loop which correspond to each other are arranged in an up-down direction, a plurality of induction coils are provided and nested from an inner to an outer, and at least one induction coil is arranged between each pair of the first electromagnetism conductive loop and the second electromagnetism conductive loop which correspond to each other.

According to an example of the present disclosure, the plurality of induction coils are energized and de-energized individually.

According to an example of the present disclosure, a total length of the first electronic conductive heating strip is larger than that of the first electromagnetism conductive loop extending along a circumference, and a total length of the second electronic conductive heating strip is larger than that of the second electromagnetism conductive loop extending along a circumference.

According to an example of the present disclosure, the cooking utensil is a frying-baking machine.

Additional aspects and advantages of embodiments of present disclosure will be given in part in the following descriptions, become apparent in part from the following descriptions, or be learned from the practice of the embodiments of the present disclosure.

Figure 1:
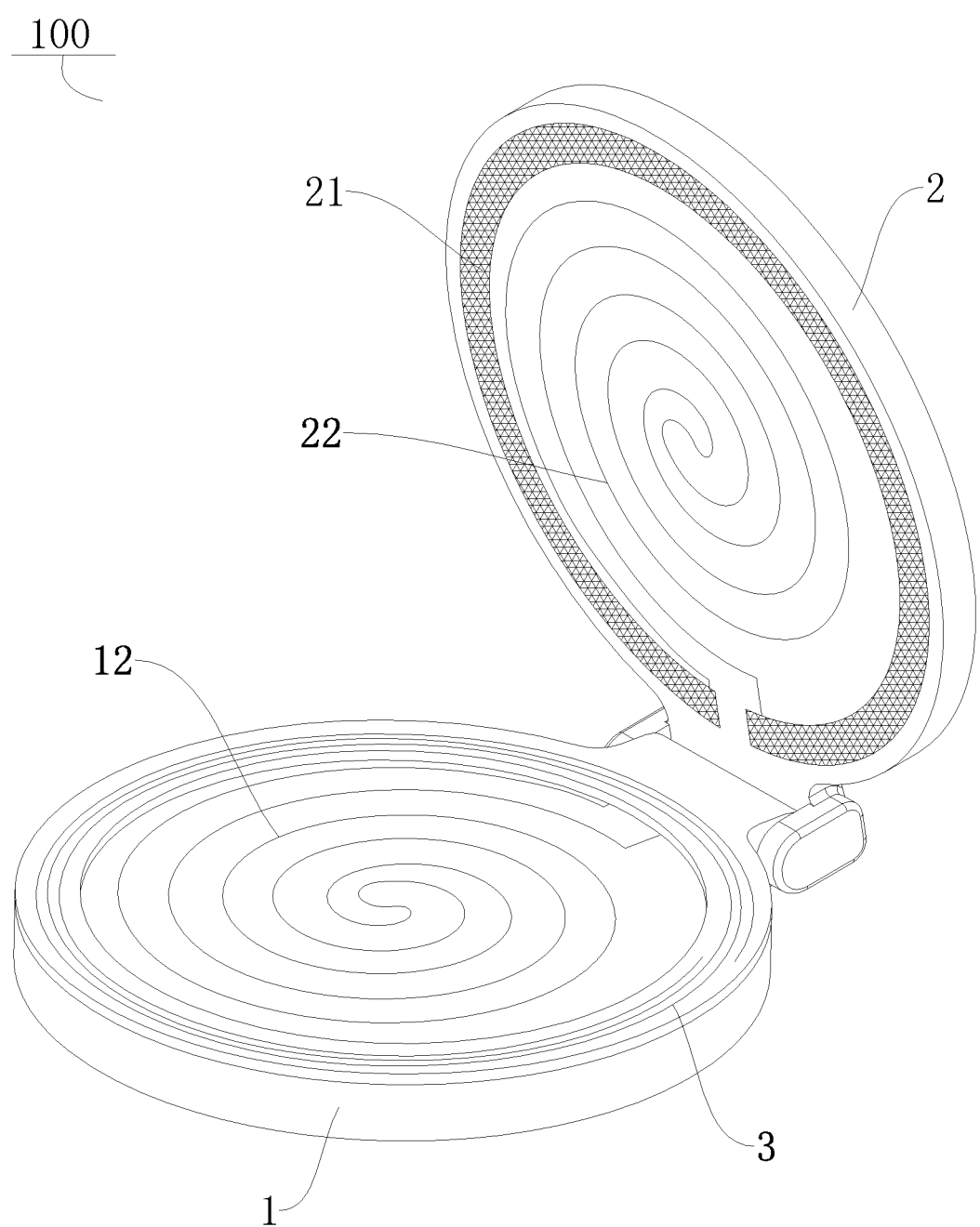
FIG. 1 is a schematic view of a cooking utensil according to an embodiment of the present disclosure.

REFERENCE NUMERALS cooking utensil 100,
pan body 1, first electromagnetism conductive loop 11,
  first electric conductive heating strip 12, cover body 2, second electromagnetism conductive loop 21, second electric conductive heating strip 22, induction coil 3.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Various different embodiments or examples are provided below to realize different structures of the present disclosure. Components and arrangements of special examples are described below for simplifying the present disclosure. Of course, they are examples rather than limit the present disclosure. In addition, reference numerals and/or letters may repeat in different examples of the present disclosure, such repetition is used for simplification and clearness and does not indicate relationship between various embodiments and/or arrangements. Furthermore, the present disclosure provides various examples of specific technics and materials, however applicability of other technics and/or uses of other materials can be understood by those skilled in the art.

The cooking utensil 100 according to embodiments of the present disclosure is described with reference to FIG. 1 to FIG. 4.

As shown in FIG. 1, the cooking utensil 100 according to an embodiment of the present disclosure includes a pan body 1, a cover body 2 and an induction coil 3.

Specifically, the pan body 1 is provided with a first electromagnetism conductive loop 11 and a first electric conductive heating strip 12, and the first electric conductive heating strip 12 and the first electromagnetism conductive loop 11 are connected to form a closed circuit. The cover body 2 covers the pan body 1 and is openable relative to the pan body. The cover body 2 is provided with a second electromagnetism conductive loop 21 and a second electric conductive heating strip 22, and the second electric conductive heating strip 22 and the second electromagnetism conductive loop 21 are connected to form a closed circuit. The induction coil 3 is arranged between the first electromagnetism conductive loop 11 and the second electromagnetism conductive loop 21, and the induction coil 3 corresponds to the first electromagnetism conductive loop 11 and the second electromagnetism conductive loop 21.

It should be understood by those skilled in the art, the induction coil 3 corresponding to the first electromagnetism conductive loop 11 and the second electromagnetism conductive loop 2 in the present disclosure means that when the induction coil 3 is energized, the induction coil 3 generates an induced magnetic field which covers at least portion of the first electromagnetism conductive loop 11 and at least portion of the second electromagnetism conductive loop 21.

When an alternating current flows through the induction coil 3, the induction coil 3 produces an alternating magnetic field, the alternating magnetic field penetrates the first electromagnetism conductive loop 11 and the second electromagnetism conductive loop 21, thereby producing potential difference between two ends of the first electromagnetism conductive loop 11 and potential difference between two ends of the second electromagnetism conductive loop 21. Science the first electric conductive heating strip 12 is connected with the first electromagnetism conductive loop 11 in series to form the closed circuit, a current is generated in the closed circuit of the first electric conductive heating strip 12 and the first electromagnetism conductive loop 11. Science the second electric conductive heating strip 22 is connected with the second electromagnetism conductive loop 21 in series to form the closed circuit, a current is generated in the closed circuit of the second electric conductive heating strip 22 and the second electromagnetism conductive loop 21. Therefore, heat can be generated where the currents flow through to heat the pan body 1 and the cover body 2, such that the cooking utensil 100 can heat dimensionally and evenly.

With the cooking utensil 100 according to the embodiment of the present disclosure, the induction coil 3 is arranged between the first electromagnetism conductive loop 11 and the second electromagnetism conductive loop 21, when the induction coil is energized, induced electromotive forces are produced on the first electromagnetism conductive loop 11 and the second electromagnetism conductive loop 21 at the same time, and the pan body 1 and the cover body 2 can be heated at the same time. Therefore, use of the induction coil 3 can be reduced, cost can be saved, the utilization ratio of electromagnetic induction energy can be raised, and the cooking utensil 100 can be made thinner.

Figure 4:
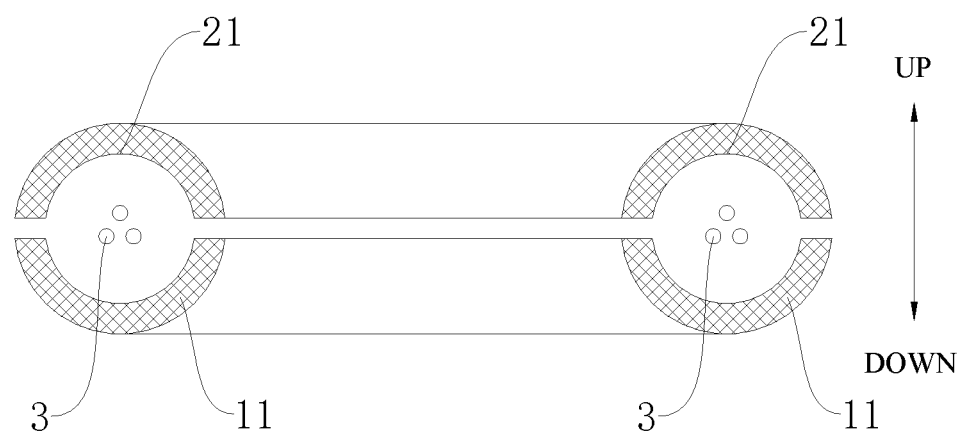
FIG. 4 is a sectional view of a first electromagnetism conductive loop, a second electromagnetism conductive loop and an induction coil according to another embodiment of the present disclosure.

In an embodiment of the present disclosure, as shown in FIG. 4, the first electromagnetism conductive loop 11 has an arc section with an upward opening, the second electromagnetism conductive loop 21 has an arc section with a downward opening, and the induction coil 3 is arranged at an inner side of the first electromagnetism conductive loop 11 and the second electromagnetism conductive loop 21, thereby effectively preventing leakage of magnetic lines of force, and further raising the utilization ratio of electromagnetic induction energy.

Further, as shown in FIG. 4, an inner periphery of the first electromagnetism conductive loop 11 corresponds to and is spaced apart from an inner periphery of the second electromagnetism conductive loop 21 in an up-down direction, and an outer periphery of the first electromagnetism conductive loop 11 corresponds to and is spaced apart from an outer periphery of the second electromagnetism conductive loop 21 in an up-down direction. On the premise that the leakage of magnetic lines of force is prevented and the utilization ratio of electromagnetic induction energy is raised, interference between the first electromagnetism conductive loop 11 and the second electromagnetism conductive loop 21 can be prevented.

Optionally, the inner periphery of the first electromagnetism conductive loop 11 and the inner periphery of the second electromagnetism conductive loop 21 define a gap ranges from 1 mm to 20 mm therebetween, and the outer periphery of the first electromagnetism conductive loop 11 and the outer periphery of the second electromagnetism conductive loop 21 define a gap ranges from 1 mm to 20 mm therebetween, thereby preventing the leakage of magnetic lines of force, and raising the utilization ratio of the electromagnetic induction energy.

Optionally, both the inner periphery and the outer periphery of the first electromagnetism conductive loop 11 are spaced apart from the inner periphery and the outer periphery of the second electromagnetism conductive loop 21 by means of a spacer, respectively, thereby effectively preventing interference between the first electromagnetism conductive loop 11 and the second electromagnetism conductive loop 21, and further ensuring that the cooking utensil 100 normally and safely works.

In an embodiment of the present disclosure, the cover body 2 is a translucent cover body 2, and the second electric conductive heating strip 22 is a translucent strip, thereby achieving visualization of the cover body 2. At the same time, the second electric conductive strip can generate heat, water drops on the cover body 2 due to steam can be reduced. Cooking conditions of food in the cooking utensil 100 can be conveniently observed.

Further, the cover body 2 is a glass cover body 2, and the second electric conductive heating strip 22 is an indium tin oxide (ITO) glass conductive strip, thereby achieving visualization of the whole cover body 2, and the cooking conditions of food in the cooking utensil 100 can be conveniently observed.

Figure 3:
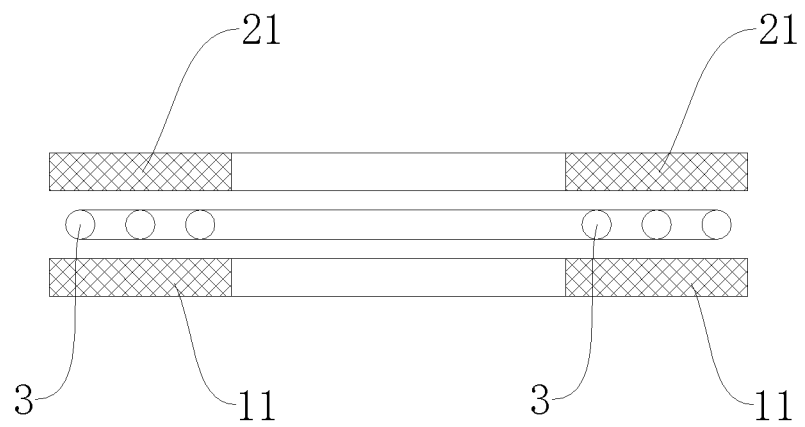
FIG. 3 is a sectional view of a first electromagnetism conductive loop, a second electromagnetism conductive loop and an induction coil according to an embodiment of the present disclosure.

In an embodiment of the present disclosure, referring to FIG. 3, a distance between the induction coil 3 and the first electromagnetism conductive loop 11 is not greater than a distance between the induction coil 3 and the second electromagnetism conductive loop 21, thereby the pan body 1 can obtain sufficient induction energy to cook food.

Figure 2:
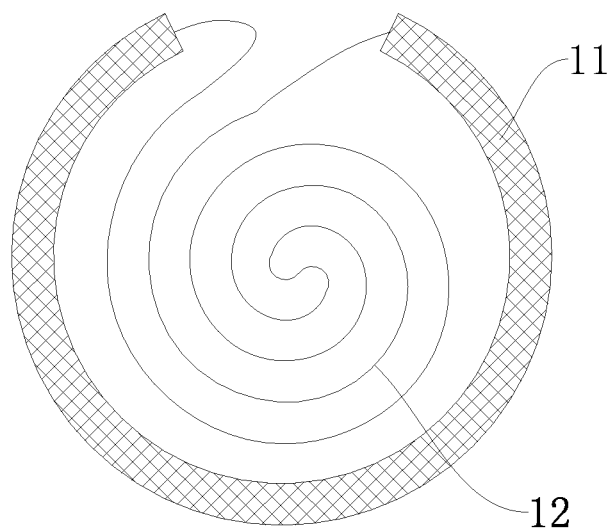
FIG. 2 is a schematic view of a first electromagnetism conductive loop and a first electric conductive heating strip of a pan body shown in FIG. 1.

In an embodiment of the present disclosure, as shown in FIG. 1 and FIG. 2, the first electromagnetism conductive loop 11 extends along a periphery of the pan body 1 and forms a loop with an aperture. Two ends of the first electric conductive heating strip 12 are connected to two ends at the aperture of the first electromagnetism conductive loop 11 respectively and located at an inner side of the first electromagnetism conductive loop 11, thereby reducing influence on a middle portion of the pan body 1 caused by the first electromagnetism conductive loop 11, and further making heating on the middle portion of the pan body 1 more evenly. The second electromagnetism conductive loop 21 extends along a periphery of the cover body 2 and forms a loop with an aperture. Two ends of the second electric conductive heating strip 22 are connected to two ends at the aperture of the second electromagnetism conductive loop 21 respectively and located at an inner side of the second electromagnetism conductive loop 21, thereby reducing influence on a middle portion of the cover body 2 caused by the second electromagnetism conductive loop 21, and further making heating on the middle portion of the cover body 2 more evenly.

In an embodiment of the present disclosure, as shown in FIG. 1 and FIG. 2, the first electric conductive heating strip 12 is evenly arranged at the pan body 1, such that the pan body 1 can be more evenly heated. The second electric conductive heating strip 22 is evenly arranged at the cover body 2, such that the cover body 2 can be more evenly heated.

Herein, even arrangement of the first electric conductive heating strip 12 means that a width of the first electric conductive heating strip 12 at locations within the range covered by the first electric conductive heating strip 12 is substantially constant, and gaps between the first electric conductive heating strip 12 at locations within the range covered by the first electric conductive heating strip 12 are substantially constant, such that the pan body 1 is evenly heated. Even arrangement of the second electric conductive heating strip 22 means that a width of the second electric conductive heating strip 22 at locations within the range covered by the second electric conductive heating strip 22 is substantially constant, and gaps between the second electric conductive heating strip 22 at locations within the range covered by the second electric conductive heating strip 22 are substantially constant, such that the cover body 2 is evenly heated.

In an embodiment of the present disclosure, the first electric conductive heating strip 12 extends at the pan body 1 in a circuitous way, and the second electric conductive heating strip 22 extends at the cover body 2 in a circuitous way. Therefore, the first electric conductive heating strip 12 and the second electric conductive heating strip 22 can adapt to the pan body 1 and the cover body in different shapes respectively. Meanwhile, the first electric conductive heating strip 12 can be more evenly arranged at the pan body 1, and the second electric conductive heating strip 22 can be more evenly arranged at the cover body 2, thereby avoiding a dead zone during heating, and further improving heating evenness of the pan body 1 and the cover body 2.

Optionally, any one of the first electric conductive heating strip 12 and the second electric conductive heating strip 22 may include a plurality of spirals which are spaced apart from each other, each spiral extends from the outer to the inner spirally along the circumferential direction of the insulating cover body 2, the plurality of spirals spiral in the same direction and are nested, and the plurality of spirals are connected in series. The first electromagnetism conductive loop 11 and the first electric conductive heating strip 12 form a closed current circuit, and the second electromagnetism conductive loop 21 and the second electric conductive heating strip 22 form a closed current circuit, thereby generating heat where currents flow to heat the pan body 1 and the cover body 2.

Optionally, the first electric conductive heating strip 12 and the second electric conductive heating strip 22 each includes two spirals connected at inner ends. Therefore, on the premise of improvement of even heating the pan body 1 and the cover body 2, structures of the first electric conductive heating strip 12 and the second electric conductive heating strip 22 can be simplified.

In an embodiment of the present disclosure, the first electric conductive heating strip 12 and the second electric conductive heating strip 22 each are an electromagnetism insulated electric conductive heating strip. An induced magnetic field generated by the induction coil 3 can be prevented from affecting the first electric conductive heating strip 12 and the second electric conductive heating strip 22, thereby ensuring even heating the pan body 1 and the cover body 2.

In an embodiment of the present disclosure, a width of the first electromagnetism conductive loop 11 is larger than that of the first electric conductive heating strip 12, and a width of the second electromagnetism conductive loop 21 is larger than that of the second electric conductive heating strip 22, thereby enlarging induced electromotive forces between two ends of the first electromagnetism conductive loop 11 and the second electromagnetism conductive loop 21, increasing heating efficiency, and improving heating evenness of the pan body 1 and the cover body 2.

In an embodiment of the present disclosure, the pan body 1 and the cover body 2 are made from a material which cannot conduct electromagnetism and electric. For example, the pan body can be a ceramic pan body, and the cover body can be a ceramic cover body. Therefore, influence on pan body 1 and cover body 2 caused by induced magnetic field generated by the induction coil 3 can be avoided, thereby ensuring heating evenness of the pan body 1 and the cover body 2 and improving safety of the cooking utensil 100 during usage.

In an embodiment of the present disclosure, a plurality of first electronic conductive heating strips 12 and/or a plurality of first electromagnetism conductive loops 11 are provided. That is, a plurality of first electronic conductive heating strips 12 are provided, or a plurality of first electromagnetism conductive loops 11 are provided, or a plurality of first electronic conductive heating strips 12 and a plurality of first electromagnetism conductive loops 11 are provided. Each first electronic conductive heating strip 12 is connected with at least one first electromagnetism conductive loop 11 in series to form a circuit, that is each first electronic conductive heating strip 12 can be connected with only one first electromagnetism conductive loop 11 in series to form a circuit, or each first electronic conductive heating strip 12 is connected with first electromagnetism conductive loops 11 in series to form a circuit. Each first electromagnetism conductive loop 11 is connected with at least one first electronic conductive heating strip 12 in series to form a circuit, that is each first electromagnetism conductive loop 11 can be connected with only one first electronic conductive heating strip in series to form a circuit, or each first electromagnetism conductive loop 11 is connected with first electronic conductive heating strips 12 in series to form a circuit. Therefore, heating evenness of the pan body 1 can be further improved.

A plurality of second electronic conductive heating strips 22 and/or a plurality of second electromagnetism conductive loops 21 are provided. That is, a plurality of second electronic conductive heating strips 22 are provided, or a plurality of second electromagnetism conductive loops 21 are provided, or a plurality of second electronic conductive heating strips 22 and a plurality of second electromagnetism conductive loops 21 are provided. Each second electronic conductive heating strip 22 is connected with at least one second electromagnetism conductive loop 21 in series to form a circuit, that is each second electronic conductive heating strip 22 can be connected with only one second electromagnetism conductive loop 21 in series to form a circuit, or each second electronic conductive heating strip 22 is connected with second electromagnetism conductive loops 21 in series to form a circuit. Each second electromagnetism conductive loop 21 is connected with at least one second electronic conductive heating strip 22 in series to form a circuit, that is each second electromagnetism conductive loop 21 can be connected with only one second electronic conductive heating strip in series to form a circuit, or each second electromagnetism conductive loop 21 is connected with second electronic conductive heating strips 22 in series to form a circuit. Therefore, heating evenness of the cover body 2 can be further improved.

Optionally, a plurality of first electronic conductive heating strips 12 are provided. The plurality of first electronic conductive heating strips 12 are connected in parallel and then are connected with the first electromagnetism conductive loop 11 in series to form a circuit. A plurality of second electronic conductive heating strips 22 are provided. The plurality of second electronic conductive heating strips 22 are connected in parallel and then are connected with the second electromagnetism conductive loop 21 in series to form a circuit. Therefore, heating evenness of the pan body 1 and the cover body 2 can be further improved.

Optionally, a plurality of first electromagnetism conductive loops 11 are provided. The plurality of first electromagnetism conductive loops 11 are connected in parallel and then are connected with the first electronic conductive heating strip 12 to form a circuit. A plurality of second electromagnetism conductive loops 21 are provided. The plurality of second electromagnetism conductive loops 21 are connected in parallel and then are connected with the second electronic conductive heating strip 22 to form a circuit. Therefore, currents in the first electronic conductive heating strip 12 and the second electronic conductive heating strip 22 can be enlarged, and heating efficiency of the pan body 1 and the cover body 2 can be improved.

Optionally, a plurality of first electromagnetism conductive loops 11 are provided and independent from each other. A plurality of first electronic conductive heating strips 12 are provided and independent from each other. The plurality of first electronic conductive heating strips 12 correspond to the plurality of first electromagnetism conductive loops 11 one by one. Each first electronic conductive heating strip 12 is connected with the corresponding first electromagnetism conductive loop 11 in series to form a circuit, thereby further improving heating evenness of the pan body 1. A plurality of second electromagnetism conductive loops 21 are provided and independent from each other. A plurality of second electronic conductive heating strips 22 are provided and independent from each other. The plurality of second electronic conductive heating strips 22 correspond to the plurality of second electromagnetism conductive loops 21 one by one. Each second electronic conductive heating strip 22 is connected with the corresponding second electromagnetism conductive loop 21 in series to form a circuit, thereby further improving heating evenness of the cover body 1.

Optionally, a plurality of first electromagnetism conductive loops 11 are provided and nested from an inner to an outer. A plurality of second electromagnetism conductive loops 21 are provided and nested from an inner to an outer. The first electromagnetism conductive loops 11 correspond to the second electromagnetism conductive loops 21 one by one, and the first electromagnetism conductive loop 11 and the second electromagnetism conductive loop 21 which correspond to each other are arranged in an up-down direction. A plurality of induction coils 3 are provided and nested from an inner to an outer, and at least one induction coil 3 is arranged between each pair of corresponding first electromagnetism conductive loop 11 and second electromagnetism conductive loop 21. When the induction coil 3 between each pair of the first electromagnetism conductive loop 11 and the second electromagnetism conductive loop 21 which correspond to each other is energized, two ends of the first electromagnetism conductive loop 11 and the second electromagnetism conductive loop 21 which correspond to each other generates induced electromotive forces respectively, thereby generating currents in the first electronic conductive heating strip 12 and the second electronic conductive heating strip 22 which are connected with the first electromagnetism conductive loop 11 and the second electromagnetism conductive loop 21 in series, and further generating heat.

Further, the plurality of induction coils 3 can be energized and de-energized individually. Therefore, when different functions of the cooking utensil 100 are used, a single induction coil 3 or the plurality of induction coils 3 can be energized, thereby meeting heat demands of different functions.

In an embodiment of the present disclosure, the total length of the first electronic conductive heating strip 12 is larger than that of the first electromagnetism conductive loop 11 extending along the circumference, and the total length of the second electronic conductive heating strip 22 is larger than that of the second electromagnetism conductive loop 21 extending along the circumference. Therefore, heating areas on the pan body 1 and the cover body 2 can be enlarged respectively, and heating evenness of the pan body 1 and the cover body 2 can be further improved.

A cooking utensil 100 according to an embodiment of the present disclosure is described with reference to FIG. 1 to FIG. 4.

Referring to FIG. 1, the cooling utensil 100 is a frying-baking machine. The frying-baking machine includes an upper baking pan (a cover body 2 shown in FIG. 1), a lower baking pan (a pan body shown in FIG. 1), and an induction coil 3.

Specifically, as shown in FIG. 2, the lower baking pan is provided with a first electromagnetism conductive loop 11 and a first electric conductive heating strip 12, and the first electromagnetism conductive loop 11 is arranged at the outer side of the first electric conductive heating strip 12. The first electric conductive heating strip 12 is evenly arranged on the lower baking pan. The first electromagnetism conductive loop 11 is in the shape of a loop with an aperture. The first electric conductive heating strip 12 includes two homodromous spirals which are nested, the two homodromous spirals are connected in series at inner ends and connected with two ends of the first electromagnetism conductive loop 11 at outer ends.

As shown in FIG. 1, the upper baking pan is provided with a second electromagnetism conductive loop 21 and a second electric conductive strip 22. The second electromagnetism conductive loop 21 is arranged at the outer side of the second electric conductive heating strip 22. The second electric conductive heating strip 22 is evenly arranged on the upper baking pan. The second electromagnetism conductive loop 21 is in the shape of a loop with an aperture. The second electric conductive heating strip 22 includes two homodromous spirals which are nested, the two homodromous spirals are connected in series at inner ends and connected with two ends of the second electromagnetism conductive loop 21 at outer ends.

Preferably, the upper baking pan is made from translucent glass material, and the second electromagnetism conductive loop 21 is made from translucent conductive glass (such as ITO), thereby achieving visualization of the whole upper baking pan. Science the second electric conductive strip 22 can generate heat, water drops on the upper baking pan due to steam can be reduced. Cooking conditions of food can be conveniently observed.

As shown in FIG. 4, when the upper baking pan is arranged on the lower baking pan, the first electromagnetism conductive loop 11 has an arc section with an upward opening, the second electromagnetism conductive loop 21 has an arc section with a downward opening. An outer periphery of the first electromagnetism conductive loop 11 corresponds to that of the second electromagnetism conductive loop 21 in an up-down direction, and an inner periphery of the first electromagnetism conductive loop 11 corresponds to that of the second electromagnetism conductive loop 21 in an up-down direction. The outer periphery of the first electromagnetism conductive loop 11 and the outer periphery of the second electromagnetism conductive loop 21 define a gap ranges from 1 mm to 20 mm therebetween, and the inner periphery of the first electromagnetism conductive loop 11 and the inner periphery of the second electromagnetism conductive loop 21 define a gap ranges from 1 mm to 20 mm therebetween. The induction coil is arranged at an inner side of the first electromagnetism conductive loop 11 and the second electromagnetism conductive loop 21 to prevent from leakage of magnetic lines of force, and further to raise the utilization ratio of electromagnetic induction energy. A distance between the induction coil 3 and the first electromagnetism conductive loop 11 is less than or equal to a distance between the induction coil 3 and the second electromagnetism conductive loop 21, such that the lower baking pan can obtain sufficient energy to fry and bake food.

When an alternating current flows through the induction coil 3, since the induction coil 3 corresponds to the first electromagnetism conductive loop 11 and the second electromagnetism conductive loop 21, the second electric conductive heating strip 22 located at the upper baking pan generates an induction current under the action of the induced electromotive force at two ends of the second electromagnetism conductive loop 21 on the upper baking pan, to heating the upper baking pan; and the first electric conductive heating strip 12 located at the lower baking pan generates an induction current under the action of the induced electromotive force at two ends of the first electromagnetism conductive loop 11 on the upper baking pan, to heating the lower baking pan.

With the frying-baking machine according to an embodiment of the present disclosure, the upper and lower baking pans can be heated at the same time when the induction coil 3 is energized, which greatly saves the cost, and the frying-baking machine can be made thinner with high utilization ratio of electromagnetic induction. In addition, the first electromagnetism conductive loop 11 and the second electromagnetism conductive loop 21 are arranged at peripheries of the lower and upper baking pans respectively, and the first electric conductive heating strip 12 and the second electric conductive heating strip 22 form spiral circuits to be used for mainly heating, thereby facilitating heating in a frying-baking area used for mainly heating can be evenness.

In the description of the present disclosure, it should be understood that, terms such as "central", "length", "width", "thickness," "upper," "lower," "left", "right", "inner", and "outer", should be construed to refer to the orientation as then described or as shown in the drawings under discussion. These relative terms are for convenience of description and do not require that the present disclosure be constructed or operated in a particular orientation. Therefore, the above terms should not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature definitely or impliedly. In the description of the present invention, the term "a plurality of" means two or more than two, unless specified otherwise.

In the description of the present disclosure, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "illustrative embodiment", "an example," "a specific example," or "some examples," means that a particular feature, structure, material, or characteristic described in connection with the embodiment or example is included in at least one embodiment or example of the present disclosure. Thus, the appearances of the phrases are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A cooking utensil comprising: a pan body provided with a first electromagnetism conductive loop and a first electric conductive heating strip, and the first electric conductive heating strip and the first electromagnetism conductive loop being connected to form a closed circuit; a cover body covering the pan body and being openable relative to the pan body, provided with a second electromagnetism conductive loop and a second electric conductive heating strip, and the second electric conductive heating strip and the second electromagnetism conductive loop being connected to form a closed circuit; and an induction coil, arranged between the first electromagnetism conductive loop and the second electromagnetism conductive loop, and corresponding to the first electromagnetism conductive loop and the second electromagnetism conductive loop; wherein the induction coil is configured to be energized to generate induced electromotive forces in the first electromagnetism conductive loop and the second electromagnetism conductive loop, wherein the first electromagnetism conductive loop extends along a periphery of the pan body and forms a loop with an aperture, two ends of the first electric conductive heating strip are connected to two ends at the aperture of the first electromagnetism conductive loop respectively and located at an inner side of the first electromagnetism conductive loop, the second electromagnetism conductive loop extends along a periphery of the cover body and forms a loop with an aperture, two ends of the second electric conductive heating strip are connected to two ends at the aperture of the second electromagnetism conductive loop respectively and located at an inner side of the second electromagnetism conductive loop.

2. The cooking utensil according to claim 1, wherein the first electromagnetism conductive loop has an arc section with an upward opening, the second electromagnetism conductive loop has an arc section with a downward opening, the induction coil is arranged at an inner side of the first electromagnetism conductive loop and the second electromagnetism conductive loop.

3. The cooking utensil according to claim 2, wherein an inner periphery of the first electromagnetism conductive loop corresponds to and is spaced apart from an inner periphery of the second electromagnetism conductive loop in an up-down direction, and an outer periphery of the first electromagnetism conductive loop corresponds to and is spaced apart from an outer periphery of the second electromagnetism conductive loop in the up-down direction.

4. The cooking utensil according to claim 3, wherein the inner periphery of the first electromagnetism conductive loop and the inner periphery of the second electromagnetism conductive loop define a gap ranges from 1 mm to 20 mm therebetween, and the outer periphery of the first electromagnetism conductive loop and the outer periphery of the second electromagnetism conductive loop define a gap ranges from 1 mm to 20 mm therebetween.

5. The cooking utensil according to claim 3, wherein both the inner periphery and the outer periphery of the first electromagnetism conductive loop are spaced apart from the inner periphery and the outer periphery of the second electromagnetism conductive loop by means of a spacer, respectively.

6. The cooking utensil according to claim 1, wherein the cover body is a translucent cover body, and the second electric conductive heating strip is a translucent strip.

7. The cooking utensil according to claim 6, wherein the cover body is a glass cover body, and the second electric conductive heating strip is an indium tin oxide (ITO) conductive strip.

8. The cooking utensil according to claim 1, wherein a distance between the induction coil and the first electromagnetism conductive loop is not greater than a distance between the induction coil and the second electromagnetism conductive loop.

9. The cooking utensil according to claim 1, wherein the first electric conductive heating strip is evenly arranged at the pan body, and the second electric conductive heating strip is evenly arranged at the cover body.

10. The cooking utensil according to claim 1, wherein the first electric conductive heating strip extends at the pan body in a circuitous way, and the second electric conductive heating strip extends at the cover body in a circuitous way.

11. The cooking utensil according to claim 10, wherein any one of the first electric conductive heating strip and the second electric conductive heating strip includes a plurality of spirals spaced apart from each other, each spiral extends from an outer side to an inner side spirally along a circumferential direction of the pan body or the cover body, the plurality of spirals spiral in the same direction and are nested, and the plurality of spirals are connected in series.

12. The cooking utensil according to claim 11, wherein the first electric conductive heating strip and the second electric conductive heating strip each comprise two spirals connected at inner ends.

13. The cooking utensil according to claim 1, wherein the first electric conductive heating strip and the second electric conductive heating strip each are an electromagnetism insulated electric conductive heating strip.

14. The cooking utensil according to claim 1, wherein a width of the first electromagnetism conductive loop is larger than that of the first electric conductive heating strip, and a width of the second electromagnetism conductive loop is larger than that of the second electric conductive heating strip.

15. The cooking utensil according to claim 1, wherein the pan body is a ceramic pan body, and the cover body is a ceramic cover body.

16. The cooking utensil according to claim 1, wherein a plurality of first electronic conductive heating strips and/or a plurality of first electromagnetism conductive loops are provided, each first electronic conductive heating strip is connected with at least one first electromagnetism conductive loop in series to form a circuit, each first electromagnetism conductive loop is connected with at least one first electronic conductive heating strip in series to form a circuit; and a plurality of second electronic conductive heating strips and/or a plurality of second electromagnetism conductive loops are provided, each second electronic conductive heating strip is connected with at least one second electromagnetism conductive loop in series to form a circuit, each second electromagnetism conductive loop is connected with at least one second electronic conductive heating strip in series to form a circuit.

17. The cooking utensil according to claim 16, wherein a plurality of first electronic conductive heating strips are provided, the plurality of first electronic conductive heating strips are connected in parallel and then are connected with the first electromagnetism conductive loop in series to form a circuit; and a plurality of second electronic conductive heating strips are provided, the plurality of second electronic conductive heating strips are connected in parallel and then are connected with the second electromagnetism conductive loop in series to form a circuit.

18. The cooking utensil according to claim 16, wherein a plurality of first electromagnetism conductive loops are provided, the plurality of first electromagnetism conductive loops are connected in parallel and then are connected with the first electronic conductive heating strip to form a circuit; and a plurality of second electromagnetism conductive loops are provided, the plurality of second electromagnetism conductive loops are connected in parallel and then are connected with the second electronic conductive heating strip to form a circuit.

19. The cooking utensil according to claim 16, wherein a plurality of first electromagnetism conductive loops are provided and independent from each other, a plurality of first electronic conductive heating strips are provided and independent from each other, the plurality of first electronic conductive heating strips correspond to the plurality of first electromagnetism conductive loops one by one, each first electronic conductive heating strip is connected with the corresponding first electromagnetism conductive loop in series to form a circuit; and a plurality of second electromagnetism conductive loops are provided and independent from each other, a plurality of second electronic conductive heating strips are provided and independent from each other, the plurality of second electronic conductive heating strips correspond to the plurality of second electromagnetism conductive loops one by one, each second electronic conductive heating strip is connected with the corresponding second electromagnetism conductive loop in series to form a circuit.

20. The cooking utensil according to claim 16, wherein a plurality of first electromagnetism conductive loops are provided and nested from an inner to an outer, a plurality of second electromagnetism conductive loops are provided and nested from an inner to an outer, the first electromagnetism conductive loops correspond to the second electromagnetism conductive loops one by one, the first electromagnetism conductive loop and the second electromagnetism conductive loop which correspond to each other are arranged in an up-down direction, a plurality of induction coils are provided and nested from an inner to an outer, and at least one induction coil is arranged between each pair of the first electromagnetism conductive loop and the second electromagnetism conductive loop which correspond to each other.

21. The cooking utensil according to claim 20, wherein the plurality of induction coils are energized and de-energized individually.

22. The cooking utensil according to claim 1, wherein a total length of the first electronic conductive heating strip is larger than that of the first electromagnetism conductive loop extending along a circumference, and a total length of the second electronic conductive heating strip is larger than that of the second electromagnetism conductive loop extending along a circumference.

23. The cooking utensil according to claim 1, wherein the cooling utensil is a frying-baking machine.

\* \* \* \* \*